S. P. HAY.
HEATING AND COOLING DEVICE FOR TREATING MILK.
APPLICATION FILED JULY 22, 1919.

1,435,295. Patented Nov. 14, 1922.

Witness

Inventor,
S. P. Hay
By C. A. Snow & Co.
Attorneys.

Patented Nov. 14, 1922.

1,435,295

UNITED STATES PATENT OFFICE.

SOREN P. HAY, OF SEATTLE, WASHINGTON.

HEATING AND COOLING DEVICE FOR TREATING MILK.

Application filed July 22, 1919. Serial No. 312,545.

*To all whom it may concern:*

Be it known that I, SOREN P. HAY, a citizen of the United States, residing at Seattle, in the county of King and State of Washington, have invented a new and useful Heating and Cooling Device for Treating Milk, of which the following is a specification.

The device forming the subject matter of this application is an improvement on the milk condenser shown in my Patent No. 1,042,912, granted on Oct. 29, 1912, and is an improvement on the milk condenser shown in my Patent No. 1,067,336, granted on July 15, 1913.

The present invention proposes as improvements, that the heating and circulating mechanism shall be located inside of the condenser. Another object of the invention is to provide means whereby the structure may be used either for condensing milk or for cooling milk. A further object of the invention is to provide novel means whereby air may be heated or cooled, before being directed through the laterally discharged milk. The invention aims to provide novel means whereby a proper circulation will be obtained.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
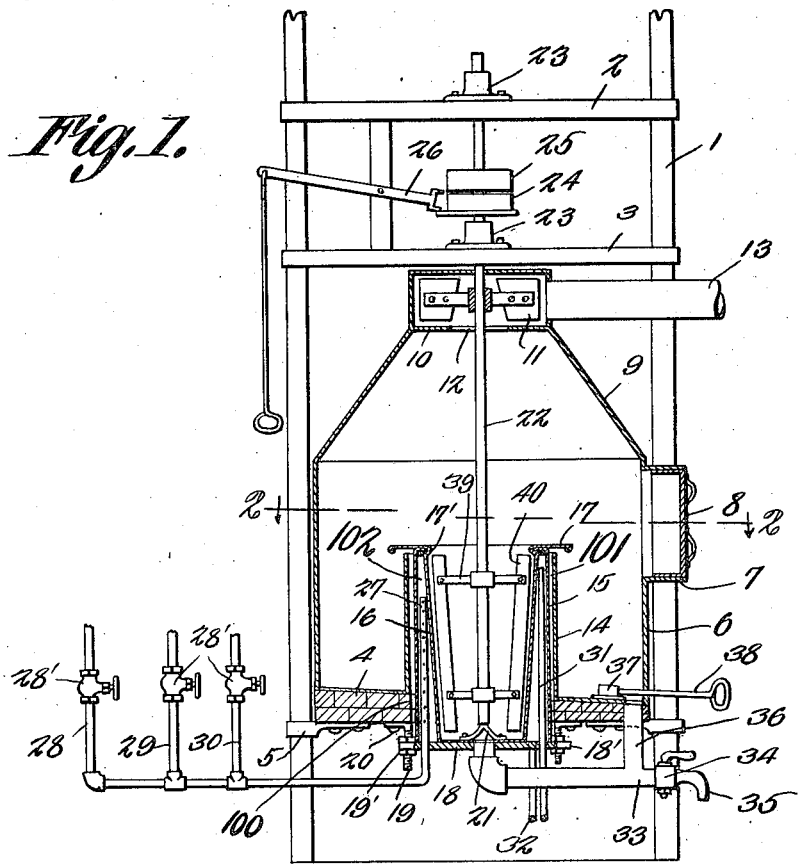
Figure 2:
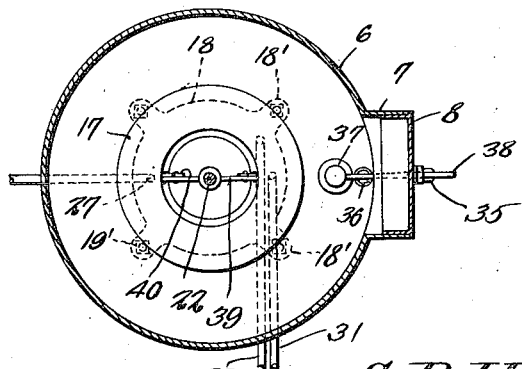

Figure 1 shows in vertical section, a device constructed in accordance with the invention, parts appearing in elevation; and Figure 2 is a cross section on the line 2—2 of Figure 1.

In carrying out the invention there is provided a frame which may be constructed variously without jeopardizing the utility of the invention. As shown the frame includes standards 1 carrying an upper platform 2, an upper platform 3 and a lower platform 4, the lower platform having an opening 100 and being supported on brackets 5 assembled with the standards 1.

A tank 6 is supported on the lower platform 4 and is provided with a lateral sleeve 7 whereby the milk to be condensed or cooled may be placed in the tank, the inlet 7 being controlled by a removable closure 8. A sleeve 14 is assembled with the bottom of the tank 6 and upstands in the tank, about the opening 100 in the lower platform 4. The tank 6 is provided with a conical upper end 9 carrying a casing 10, in the bottom of which, an opening 12 is fashioned. A vapor conduit 13 leads from the casing 10.

Within the sleeve 14, a container is located. This is a composite structure and comprises a tube 15, spaced from the sleeve 14 and from the edge of the opening 100 to define an air passage 101. The end of the tube 15 is closed by a base plate 18 having ears 18' cooperating with nuts 19' on hangers 19, attached as shown at 20 to the lower platform 4. A receptacle 16 of inverted frusto-conical form constitutes a part of a retainer above alluded to and is supported on the base plate 18, the receptacle being located within the tube 15 but being spaced from the tube. The receptacle 16 is supplied at its upper end with an outwardly extended flange 17 which projects laterally beyond the sleeve 14, the flange being connected to the inner end of the tube 15, to form a closed chamber 102 about the receptacle 16. The flange 17 is supplied with a circumscribing bead 17' which projects inwardly toward the axis of the receptacle 16.

A pipe 33 is provided, the inner end of the pipe 33 communicating with the interior of the receptacle 16, through the bottom thereof and through the base plate 18, the pipe being supplied at its outer end with a spigot 35 and with a valve 34. The pipe 33 has a branch 36 opening through the platform 4 and the bottom of the tank 6, the branch 36, therefore, communicating with the interior of the tank. The branch 36 of the pipe 33 is controlled by a valve 37, operated by means of a stem 38 accessible from the outside of the tank 6.

A thrust bearing 21 in the form of a spider, is mounted on the bottom of the receptacle 16 and receives for rotation, the lower end of a shaft 22 extended through the casing 10 and journaled in bearings 23 on the platform 2 and 3. The shaft carries a beater, located within the receptacde 16 and comprising, preferably, arms 39 and blades 40, the outer edges of the blades being disposed parallel to the walls of the receptacle 16, to secure a proper agitation and an upward flow of the milk in the receptacle. A fan 11 is mounted on the shaft 22 within the casing 10. A pulley 24 is loose on the shaft 22 above the platform 3, a pulley 25 being fixed to the shaft. A belt shifter 26 is mounted on the frame and cooperates with the pulleys 24 and 25, in a way which will be understood clearly by those skilled in the art.

A pipe 27 extends upwardly through the base plate 18 into the chamber 102, and is perforated within the chamber. The pipe 27 extends laterally and communicates with a steam pipe 28, with a water pipe 29 and with a pipe 30 through which brine or any other cooling medium may be supplied, the pipes 28, 29 and 30 being supplied with valves 28'. An overflow pipe 31 passes into the chamber 102 through the base plate 18 and terminates adjacent to the top of the chamber, it being possible to drain the chamber by way of a pipe 32 mounted in the base plate 18.

In practical operation, a quantity of milk is placed in the tank 6 through the inlet 7. The valve 37 may be adjusted with respect to the branch 36 of the pipe 33 by means of the stem 38, so as to regulate the circulation, the milk flowing by way of the branch 36 and the pipe 33 into the receptacle 16. The beater 39—40 rotates within the receptacle 16, and the milk rises, the milk passing across the bead 17', which serves to distribute and equalize the flow of milk, the milk moving laterally across the flange 17 and being projected, in the form of a fog or mist, against the side wall of the tank 6. The vapor derived from the milk is sucked away through the conduit 13 by the action of the fan 11. The milk in the tank 6 may again traverse the pipes 33 and 36, the cycle being continued as long as is considered desirable. The condensed milk may be drawn away by opening the valve 34. As hereinbefore stated, the circulation through the elements 36 and 33 may be adjusted by regulating the position of the valve 37.

If steam is supplied to the pipe 27, the contents of the receptacle 16 will be heated. Further, when the fan 11 is operated, air will be drawn upwardly through the passage 101 between the tube 15 and the sleeve 14, air being heated, owing to the presence of the pipe 27. The heated air is carried upwardly through the milk, as the milk moves laterally and outwardly across the flange 17 and consequently, the process of condensation is accelerated. Water of condensation may flow from the chamber 102 by way of the pipe 32. If desired a cooling medium may be introduced into the chamber 102 by way of the pipe 30 and the pipe 27. The apparatus, therefore may be used for cooling purposes, as well as for condensing.

Having thus described the invention, what is claimed is:—

1. In a device of the class described, a tank having a bottom; a sleeve carried by the bottom and upstanding therefrom; a container within the sleeve, the container comprising a tube, and a receptacle within the tube and spaced therefrom, the receptacle being provided with means for directing the contents of the receptacle into the tank; a beater rotatable in the receptacle; and means assembled with the tube for supporting the container in the tank.

2. In a device of the class described, a tank having a sleeve; a container within the sleeve and spaced therefrom to form an air inlet; the container having a flange discharging laterally across the top of the inlet; a heating means interposed between the container and the sleeve; a suction device cooperating with the tank; a beater operating in the container; and a circulation connection between the tank and the container.

In testimony that I claim the foregoing as my own, I have hereto affixed my signature in the presence of two witnesses.

SOREN P. HAY.

Witnesses:
Thos. G. Mortland,
T. A. Evanson.